US008183821B2

(12) United States Patent
Sakurai (10) Patent No.: US 8,183,821 B2
(45) Date of Patent: May 22, 2012

(54) CHARGING DEVICE FOR ELECTRIC AUTOMOBILE (75) Inventor: Masato Sakurai, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 760 days.

(21) Appl. No.: 12/245,024

(22) Filed: Oct. 3, 2008

(65) Prior Publication Data
US 2009/0096410 A1    Apr. 16, 2009

(30) Foreign Application Priority Data

Oct. 10, 2007  (JP) ................................ 2007-264062

(51) Int. Cl.
*H02J 7/00* (2006.01)
*H02J 7/16* (2006.01)
(52) U.S. Cl. ........ 320/104; 320/111; 320/109; 320/107; 320/125; 320/127
(58) Field of Classification Search .................. 320/104, 320/111, 125, 127, 124, 103, 107, 137, 134, 320/135, 136, 109; 307/80; 340/995.27; 180/65.1
See application file for complete search history.

(56) References Cited

U.S. PATENT DOCUMENTS

| | | | | |
|---|---|---|---|---|
| 5,462,439 A * | 10/1995 | Keith | ............................. | 320/109 |
| 6,054,861 A * | 4/2000 | Takahashi | ..................... | 324/428 |
| 6,362,599 B1 * | 3/2002 | Turner et al. | .................. | 320/135 |
| 7,602,143 B2 * | 10/2009 | Capizzo | ........................ | 320/109 |
| 7,746,049 B2 * | 6/2010 | Sato | ............................... | 323/288 |
| 2006/0043933 A1 * | 3/2006 | Latinis | ......................... | 320/132 |
| 2009/0313098 A1 * | 12/2009 | Hafner et al. | ................ | 705/14.1 |
| 2010/0237985 A1 * | 9/2010 | Landau-Holdsworth et al. | ............................. | 340/5.8 |

FOREIGN PATENT DOCUMENTS

JP   2000-004542   1/2000

* cited by examiner

*Primary Examiner* — Melissa Koval
*Assistant Examiner* — Alexis Boateng
(74) *Attorney, Agent, or Firm* — McDermott Will & Emery LLP (57) ABSTRACT

The present invention provides a charging device for an electric automobile that can reduce the number of connection terminals provided in a vehicle and respond to a plurality of charging methods including normal charging and fast charging. Fast charging lines, an in-vehicle charger, and a feeder unit are connected to a power supply circuit for supplying power from a high voltage battery to a motor/generator. The fast charging lines, normal charging lines connected to the in-vehicle charger, and feeder lines connected to the feeder unit are respectively connected to common connection terminals of a connector. Relays provided on the respective lines are activated in accordance with the type of a connection plug attached to the connector, and as a result, charging is performed in accordance with the type of the connection plug.

6 Claims, 6 Drawing Sheets

CHARGING DEVICE FOR ELECTRIC AUTOMOBILE

CROSS-REFERENCE TO RELATED APPLICATIONS

The disclosure of Japanese Patent Application No. 2007-264062, filed on Oct. 10, 2007 including the specification, drawings and abstract, is incorporated herein by reference in its entirety.

BACKGROUND OF THE INVENTION

1. Field of the Invention

The present invention relates to a charging device for an electric automobile, which charges a storage device for supplying power to an electric motor for driving a vehicle.

2. Description of the Related Art

Electric automobiles include vehicles that employ only an electric motor as a drive source and hybrid vehicles having both an electric motor and an engine as drive sources. In both types of electric automobile, a storage device such as a battery is provided to supply power to the electric motor, and when the residual capacity of the battery decreases, the battery must be charged from the outside. In a hybrid vehicle having both an electric motor and an engine as drive sources, the battery is usually charged by driving the engine, but the battery may also be charged by supplying power from an external power source, without driving the engine.

With regard to a battery provided in a vehicle, a type of charging that is performed by an in-vehicle charger installed in the vehicle and a type of charging that is performed by a dedicated charger disposed on the exterior of the vehicle have been proposed. In the type of charging that is performed by an in-vehicle charger, a receptor to which a plug connected to an external commercial power supply is connected, or in other words a connector, is attached to the vehicle. In the type of charging that is performed by a dedicated charger disposed on the exterior of the vehicle, a receptor in which a charging gun provided on a feeder cable is connected to the charger is attached to the vehicle. To enable the battery to be charged by either the in-vehicle charger or the external dedicated charger, the vehicle is provided with both the receptor to which the power source side plug is connected, or in other words the connector, and the receptor to which the charging gun of the feeder cable is connected.

Japanese Unexamined Patent Application Publication No. 2000-4542 describes a charging device having a stationary charger that outputs rectified power by rectifying an AC 200V commercial power supply and a portable charger that outputs rectified power by rectifying an AC 100V commercial power supply, wherein a battery is charged by the portable charger, and by combining the portable charger with the stationary charger, the battery is charged using either the commercial AC 100V power supply or the commercial AC 200V power supply.

An AC 100V commercial power supply is widely distributed and can be used anywhere, which is convenient for charging, but a power supply amount thereof per unit time is limited, and therefore an AC 100V commercial power supply is not suitable for fast charging during which a large supply of power is required. To charge the battery rapidly, charging must be performed directly from a transmission line capable of supplying a large amount of power per unit time, or from an AC 200V commercial power supply or the like.

However, to respond to both normal charging using an AC 100V commercial power supply and fast charging using a higher voltage, the vehicle side must be provided with both a normal charging connection terminal and a fast charging connection terminal. This is problematic in that the connection terminal must be selected at the time of charging in accordance with the charging method, and the number of terminals exposed to the exterior of the vehicle increases.

In an electric automobile, meanwhile, when the charging capacity of the battery decreases such that the battery goes flat, travel becomes impossible, and therefore it has been proposed that the vehicle having the flat battery be charged using a dedicated charging vehicle. However, this is not convenient since time is wasted waiting for the dedicated charging vehicle to arrive. Convenience is improved when the vehicle having the flat battery can be charged by an electric automobile traveling in the vicinity, but to make this possible, a new feeding connection terminal for establishing a cable connection with another vehicle must be provided on the vehicle and exposed to the vehicle exterior, leading to an undesirable further increase in the number of terminals.

SUMMARY OF THE INVENTION

An object of the present invention is to provide a charging device for an electric automobile that can reduce the number of connection terminals provided on the vehicle and respond to a plurality of charging methods including normal charging and fast charging.

Another object of the present invention is to provide a charging device for an electric automobile that can respond to power feeding with another electric automobile, in addition to normal charging and fast charging.

A charging device for an electric automobile according to the present invention charges a storage device that supplies power to an electric motor for driving a vehicle, and comprises: a connector having a common connection terminal to which a fast charging line, which is connected to a power supply circuit for supplying the power of the storage device to the electric motor, and a normal charging line, which is connected to the power supply circuit, are respectively connected; first switching means for switching the fast charging line to a connected state when a connection plug of a fast charger having a connection terminal that is connected to the common connection terminal is attached to the connector; second switching means for switching the normal charging line to a connected state when a normal charging connection plug having a connection terminal that is connected to the common connection terminal is attached to the connector; and control means which, when one of the connection plugs is attached to the connector, switch the switching means corresponding to the connection plug to a connected state in accordance with a type of the connection plug.

The charging device for an electric automobile according to the present invention further comprises: a feeder line that is connected to a feeder circuit having a feeder unit connected to the power supply circuit, and connected to the common connection terminal; and third switching means that include a connection terminal connected to the common connection terminal and switch the feeder line to a connected state when a feeding connector connected to a power supply circuit of another vehicle is attached to the connector, wherein the control means switch the third switching means to a connected state when a connection plug of the feeding connector is attached to the connector.

In the charging device for an electric automobile according to the present invention, the feeder unit supplies the power of the storage device to the power supply circuit of the other vehicle via the feeding connector attached to the connector.

In the charging device for an electric automobile according to the present invention, power from the other vehicle is supplied to the storage device via the feeding connector attached to the connector. Further, in the charging device for an electric automobile according to the present invention, an in-vehicle charger is provided on the normal charging line such that when the normal charging connection plug is attached to the connector, the in-vehicle charger rectifies power supplied from an external commercial power supply via the connection plug and charges the storage device with the rectified power.

In the charging device for an electric automobile according to the present invention, each of the connection plugs is provided with plug side communicating means for outputting a signal corresponding to the type of the connection plug to vehicle side communicating means provided in the vehicle, and the control means determine the type of the connection plug on the basis of a signal from the vehicle side communicating means.

According to the present invention, the connector comprising the common connection terminal, to which the fast charging line and the normal charging line are respectively connected, is provided in the vehicle such that when the connection plug of the fast charger is attached to the connector, the fast charging line is switched to a connected state by the switching means, and when the normal charging connection plug is attached to the connector, the normal charging line is switched to a connected state by the switching means. Hence, when either the connection plug of the fast charger or the normal charging connection plug is attached to the connector, one of the fast charging line and the normal charging line is controlled to a connected state in accordance with the type of the connection plug, and therefore any of a plurality of types of connection plug can be attached to the single connector having the common connection terminal, enabling reductions in the number of vehicle side connectors and the number of connection terminals.

According to the present invention, the feeding connector for establishing a connection with the power supply circuit of another electric automobile is connected to the connector such that the power of the storage device of the electric automobile can be supplied to the storage device of the other electric automobile via the common connection terminal and the storage device can be charged from the other electric automobile via the feeder circuit. Thus, when the charging capacity of the storage device of the electric automobile decreases, charging can be performed from another electric automobile traveling in the vicinity of the electric automobile without using a dedicated charging vehicle and without increasing the number of vehicle side connectors and the number of connection terminals, and the other electric automobile can also be charged.

DESCRIPTION OF THE PREFERRED EMBODIMENTS

Figure 1:
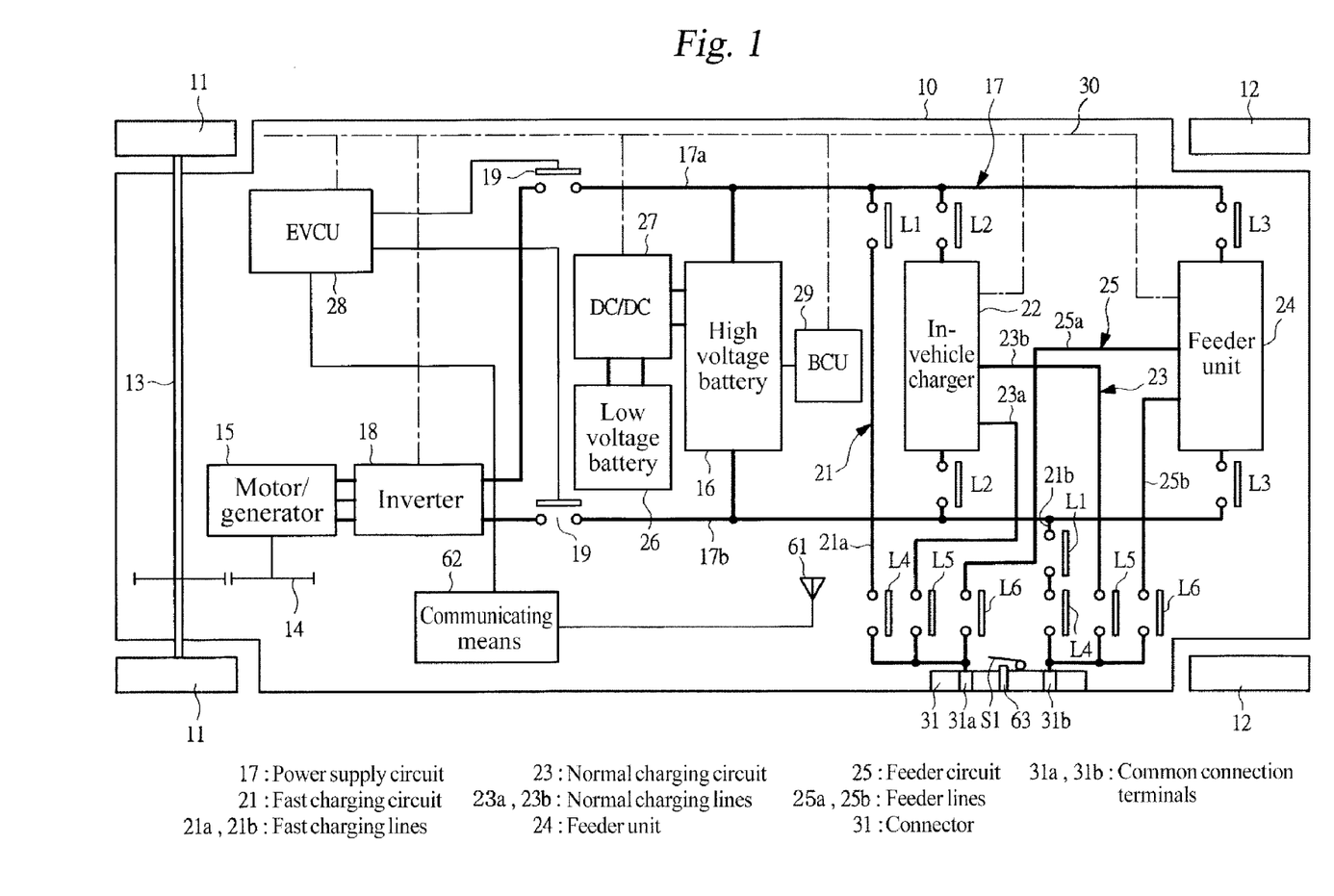
FIG. 1 is a schematic diagram showing a charging device for an electric automobile according to an embodiment of the present invention.

An embodiment of the present invention will be described in detail below on the basis of the drawings. FIG. 1 is a schematic diagram showing a charging device for an electric automobile according to an embodiment of the present invention.

An electric automobile 10 has drive-wheel side front wheels and driven-wheel side rear wheels 12, and a motor/generator is connected to a drive shaft 13 for driving the front wheels via a gear pair 14 having a fixed gear ratio. The motor/generator 15, which serves as a vehicle-driving electric motor, is a three-phase alternating current synchronous motor, and a high voltage battery 16 for supplying power thereto is installed in the vehicle 10 as a storage device. The high voltage battery 16 employs a lithium ion battery, i.e. a secondary battery, and supplies 400V of direct current power, for example, to the motor/generator 15 serving as the load by connecting a plurality of single cell batteries, which are the smallest units of a battery, in series.

To supply the power of the high voltage battery 16 to the motor/generator 15, the high voltage battery 16 is connected to an inverter 18 via power supply lines 17a, 17b, which together constitute a power supply circuit 17. The inverter 18 converts a direct current from the high voltage battery 16 into a three-phase alternating current and supplies power to the motor/generator 15. The motor/generator 15 has a function for recovering regenerative energy by generating power during braking of the vehicle and charging the high voltage battery 16 with this generated power. A main relay 19 for switching the high voltage battery 16 and the inverter 18 between a connected state and a disconnected state is provided on the respective power supply lines 17a, 17b.

Fast charging lines 21a, 21b constituting a fast charging circuit 21 for charging the high voltage battery 16 directly from a fast charger disposed on the exterior of the vehicle are connected to the power supply lines 17a, 17b, and a relay L1 for switching the respective fast charging lines 21a, 21b ON and OFF is provided on the respective fast charging lines 21a, 21b.

An in-vehicle charger 22 is connected to the power supply lines 17a, 17b via a relay L2. An external AC 100V commercial power supply is connected to the in-vehicle charger 22 by normal charging lines 23a, 23b constituting a normal charging circuit 23. The in-vehicle charger 22 rectifies the external AC 100V commercial power supply to convert it into a 400V direct current, and charges the high voltage battery 16 therewith.

A feeder unit 24 is connected to the power supply lines 17a, 17b via a relay L3. Feeder lines 25a, 25b constituting a feeder circuit 25 are connected to the feeder unit 24. The feeder unit 24 functions to charge the power of the high voltage battery 16 to a high voltage battery of another electric automobile while connected to a power supply circuit of the other electric automobile, and to charge the high voltage battery 16 by supplying the power of the high voltage battery of the other electric automobile to the high voltage battery 16.

A low voltage battery 26 is installed in the vehicle 10 to supply 12V of direct current power, for example, to low voltage devices installed in the vehicle such as an audio device and an air-conditioning fan. The low voltage battery 26 is charged by reducing the power of the high voltage battery 16 using a DC/DC converter 27.

The inverter 18, the in-vehicle charger 22, the feeder unit 24, and the DC/DC converter 27 are connected to a vehicle control unit (EVCU) 28, which serves as control means, by a communication network 30, i.e. a CAN (car area network), so as to be capable of exchanging information with the vehicle control unit 28. Battery information such as the voltage and remaining capacity of the high voltage battery 16 is transmitted to the vehicle control unit 28 from a battery control unit (BCU) 29 via the communication network 30. The vehicle control unit 28 and battery control unit 29 include a CPU for calculating control signals, ROM for storing control programs, calculation equations, map data, and so on, and RAM for storing data temporarily.

A receptor attached to the vehicle 10, or in other words a connector 31, is provided with common connection terminals 31a, 31b that are exposed to the exterior of the vehicle. The fast charging line 21a, the normal charging line 23a, and the feeder line 25a are connected to one of the common connection terminals 31a, while the fast charging line 21b, the normal charging line 23b, and the feeder line 25b are connected to the other common connection terminal 31b.

A relay L4 for switching the common connection terminals 31a, 31b and the fast charging circuit 21 between a connected state and a disconnected state is provided on the fast charging lines 21a, 21b as first switching means, and a relay L5 for switching the common connection terminals 31a, 31b and the normal charging circuit 23 between a connected state and a disconnected state is provided on the normal charging lines 23a, 23b as second switching means. Further, a relay L6 for switching the common connection terminals 31a, 31b and the feeder circuit 25 between a connected state and a disconnected state is provided on the feeder lines 25a, 25b as third switching means.

Figure 2:
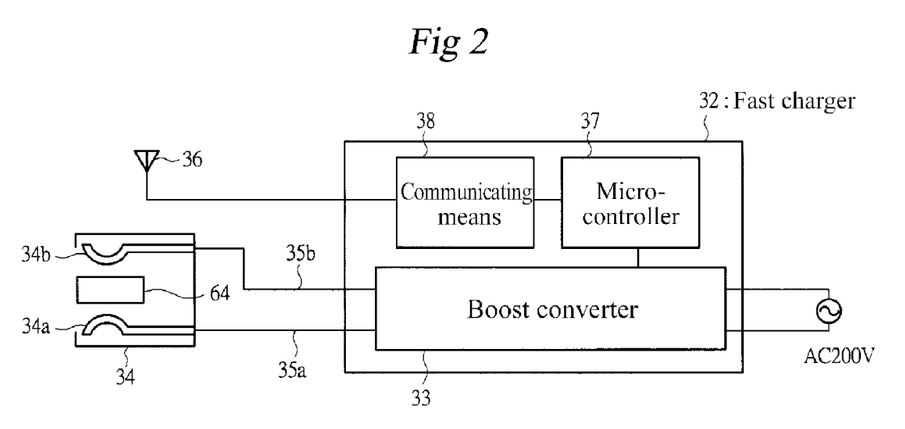
FIG. 2 is a schematic diagram showing a fast charger.

FIG. 2 is a schematic diagram showing a fast charger 32. The fast charger 32 includes a boost converter 33 that rectifies a commercial power supply of AC 200V to boost it to a 400V direct current, for example, and a plug, not shown in the drawing, connected to a commercial power supply terminal is provided on the boost converter 33. The boost converter 33 is connected to connection terminals 34a, 34b provided on a fast charging connection plug 34 via output cables 35a, 35b. The connection plug 34 is attached to the vehicle side connector 31, and when the connection plug 34 is attached to the connector 31 such that the connection terminals 34a, 34b are connected to the common connection terminals 31a, 31b, respectively, power boosted by the boost converter 33 is supplied to the high voltage battery 16. The connection plug 34 is provided with a communication antenna 36, and the communication antenna 36 is controlled by a micro-controller 37 provided in the fast charger 32, and connected to communicating means 38 having a transceiver.

The fast charger 32 charges the high voltage battery 16 by boosting an AC 200V commercial power supply. However, the fast charger 32 may rectify a commercial power supply of 400V or the like, or convert power supplied from a transmission line or other energy converted into electric power into an arbitrary direct current power supply.

Figure 3:
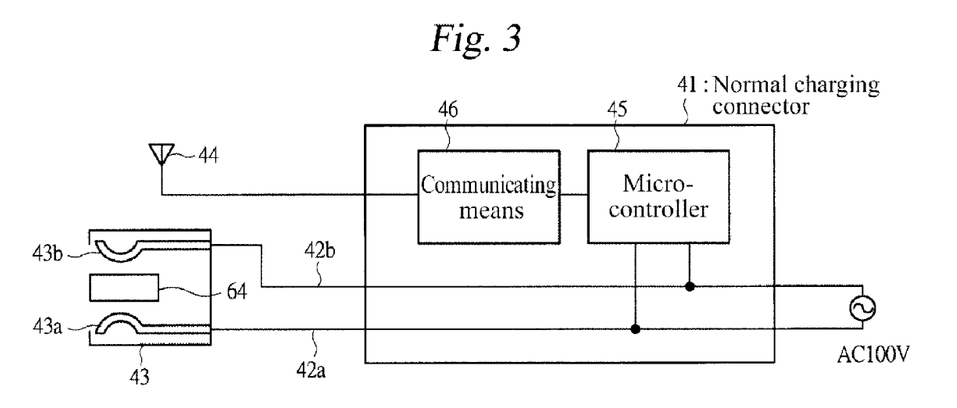
FIG. 3 is a schematic diagram showing a normal charging connector for supplying power to an in-vehicle charger serving as a normal charger from the outside.

FIG. 3 is a schematic diagram showing a normal charging connector 41 for supplying power to the in-vehicle charger 22 serving as a normal charger from the outside. The normal charging connector 41 includes a plug, not shown in the drawing, connected to a power supply terminal of an AC 100V commercial power supply. When output cables 42a, 42b connected to the power supply terminal via the plug are connected to connection terminals 43a, 43b provided on a connection plug 43 and the connection plug 43 is attached to the connector 31 such that the connection terminals 43a, 43b are connected to the common connection terminals 31a, 31b, respectively, an AC 100V commercial power supply is supplied to the in-vehicle charger 22. The in-vehicle charger 22 charges the high voltage battery 16 by rectifying AC 100V to boost it to a 400V direct current, for example. The connection plug 43 is provided with a communication antenna 44, and the communication antenna 44 is controlled by a micro-controller 45 provided in the normal charging connector 41, and connected to communicating means 46 having a transceiver. The micro-controller 45 is provided with a power supply circuit for rectifying and reducing a commercial power supply.

Figure 4:
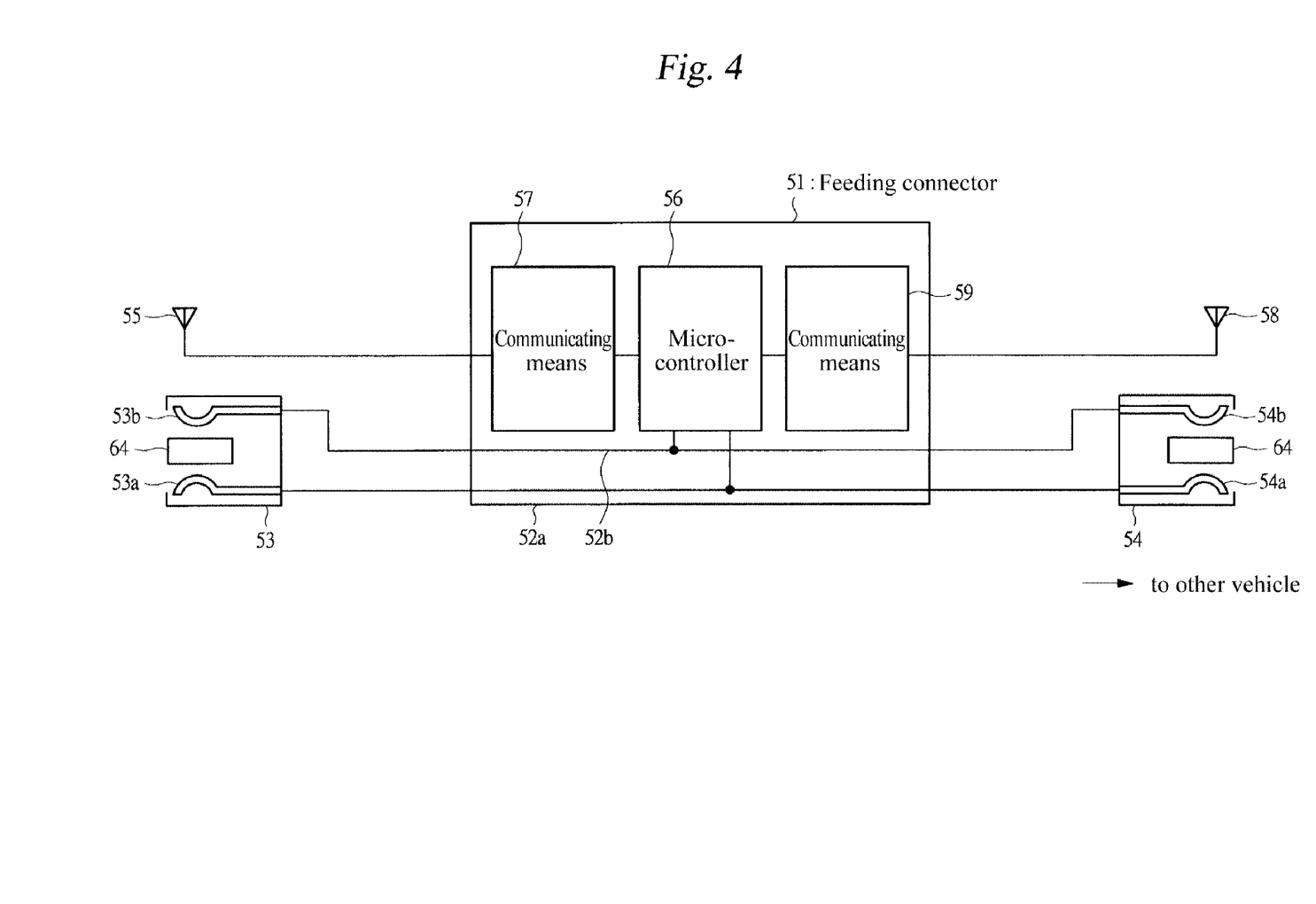
FIG. 4 is a schematic diagram showing a feeding connector for connecting a feeder unit to a power supply device of another electric automobile.

FIG. 4 is a schematic diagram showing a feeding connector 51 for connecting the feeder unit 24 to a power supply device of another electric automobile. One end of connection cables 52a, 52b provided on the feeding connector 51 is connected to connection terminals 53a, 53b provided on a connection plug 53, and the other end of the connection cables 52a, 52b is connected to connection terminals 54a, 54b provided on a connection plug 54. Hence, when the connection plug 53 is attached to the connector 31 such that the connection terminals 53a, 53b are connected to the common connection terminals 31a, 31b, respectively, and the connection plug 54 is attached to a connector, not shown in the drawing, of another vehicle such that the connection terminals 54a, 54b are connected to a power supply circuit of the other vehicle, including a high voltage battery and so on, power can be supplied from the high voltage battery 16 of the vehicle 10 to the power supply circuit of the other vehicle to charge the high voltage battery of the other vehicle. On the other hand, the high voltage battery 16 installed in the vehicle 10 can be charged by supplying power thereto from the high voltage battery of the other vehicle. The connection plug 53 is provided with a communication antenna 55, and the communication antenna 55 is controlled by a micro-controller 56 provided in the feeding connector 51, and connected to communicating means 57 having a transceiver. The connection plug 54 is provided with a communication antenna 58, and the communication antenna 58 is controlled by a micro-controller 56 and connected to communicating means 59 having a transceiver.

The connection plugs 34, 43 and 53 are shaped identically, as are the respective connection terminals thereof, and all of the connection plugs 34, 43 and 53 are formed to be attached to the vehicle side connector 31. The vehicle-body side connector 31 is provided with a detection switch S1 that is activated when one of the connection plugs 34, 43 and 53 is attached to the connector 31, and ON/OFF signals are transmitted from the detection switch S1 to the vehicle control unit 28. A communication antenna 61 is provided on the vehicle body side, and communicating means 62 having a transceiver are connected to the vehicle control unit 28 via the communication network 30. The fast charger 32, normal charging connector 41, and feeding connector 51 exchange information with the vehicle control unit 28 via the communicating means 38, 46, 57, respectively.

Figure 5:
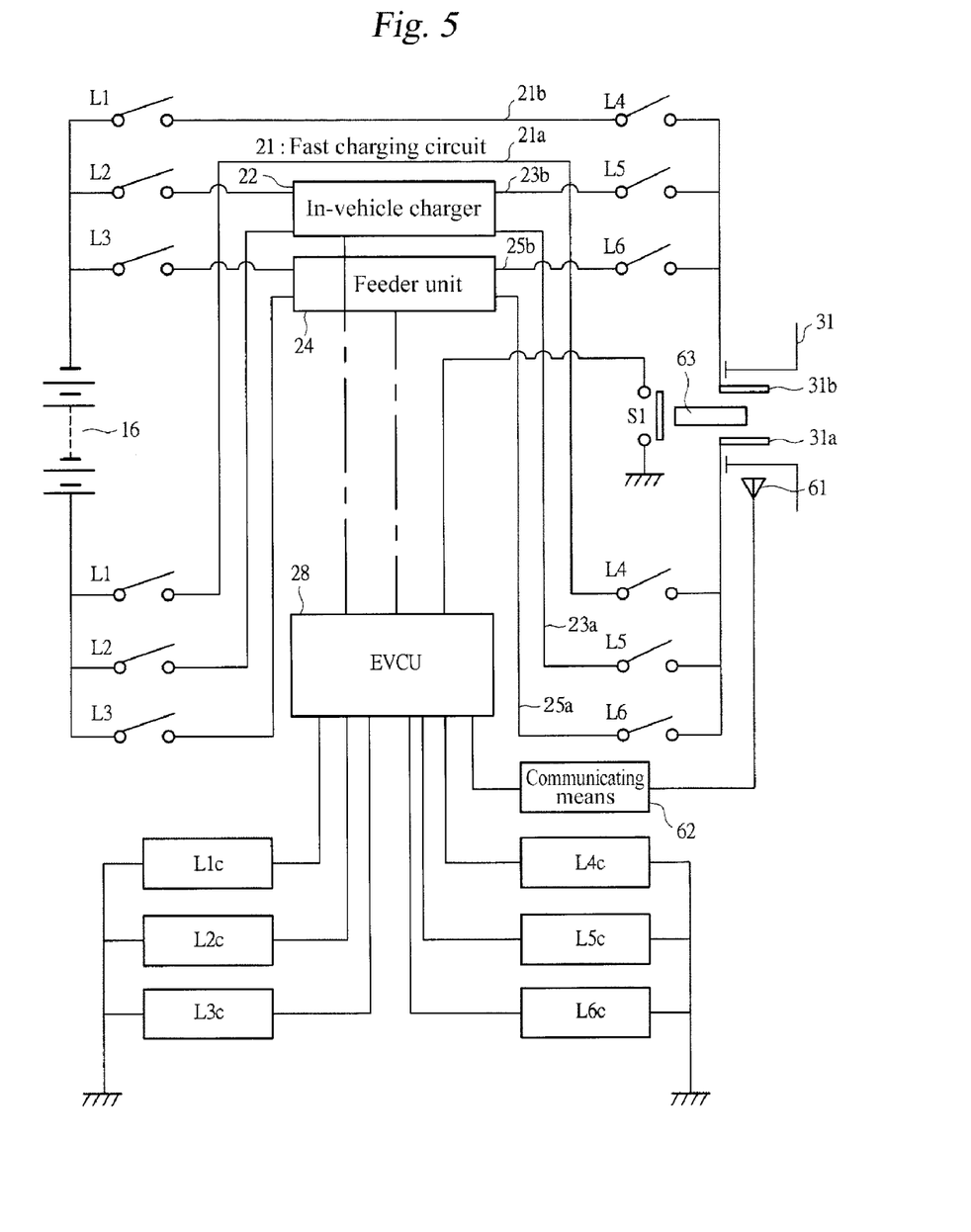
FIG. 5 is a circuit diagram showing connection states of a vehicle control unit with relays and a detection switch shown in FIG. 1.

FIG. 5 is a circuit diagram showing connection states of the vehicle control unit 28 with the relays L1 to L6 and the detection switch S1 shown in FIG. 1. A drive signal is transmitted from the vehicle control unit 28 to six coils L1c to L6c corresponding respectively to the relays L1 to L6, and when a drive signal is transmitted to a coil, the corresponding relay switches ON. The connector 31 is provided with a switch activating member 63, and a driving member 64 is provided in each of the connection plugs 34, 43, 53 and 54 in accordance with the switch activating member 63 such that when one of the connection plugs is attached to the connector 31, the switch activating member 63 is driven by the driving member 64, thereby switching the detection switch S1 ON such that an ON signal is transmitted to the vehicle control unit 28.

Figure 6:
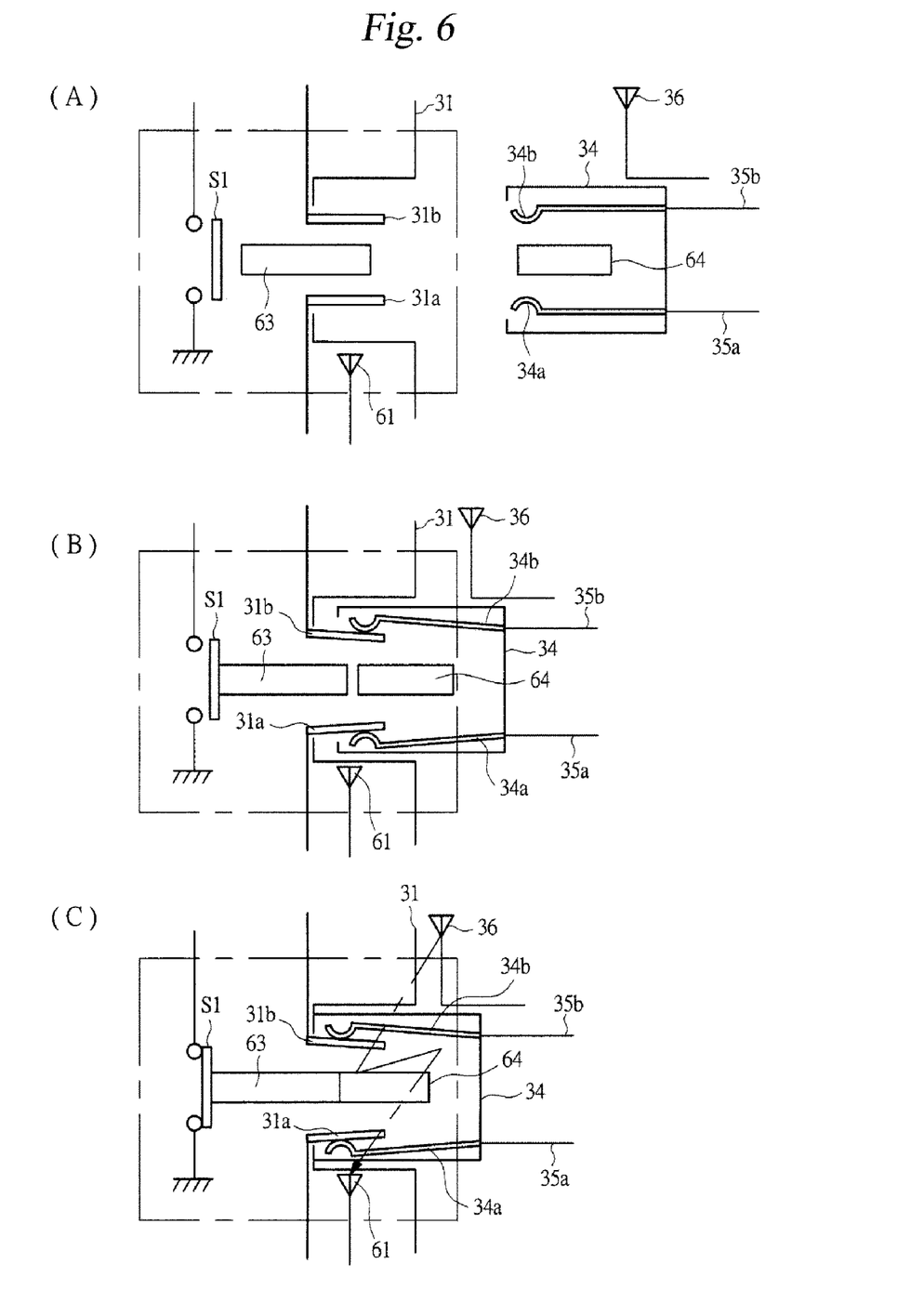
FIGS. 6A to 6C are schematic diagrams showing a procedure for attaching a connection plug of the fast charger shown in FIG. 2 to a connector.

FIGS. 6A to 6C are schematic diagrams showing a procedure for attaching the connection plug 34 of the fast charger 32 shown in FIG. 2 to the connector 31. When the connection plug 34 is attached to the connector 31 from a removed state relative to the connector 31, as shown in FIG. 6A, the connection terminals 34a, 34b of the connection plug 34 come into contact with the common connection terminals 31a, 31b, as shown in FIG. 6B. When attachment of the connection plug 34 to the connector 31 is complete, as shown in FIG. 6C, the driving member 64 causes the switch activating member 63 to switch the detection switch S1 ON. When the detection switch S1 detects that attachment of the connection plug 34 is complete, a signal is transmitted to the communicating means 62 from the vehicle control unit 28. As a result, wireless communication is performed between the vehicle side communication antenna 61 and the fast charger 32 side communication antenna 36. On the basis of a request signal issued to the communicating means 38 of the fast charger 32 by the communicating means 62, the communicating means 38 transmit information indicating the type thereof, or in other words that the fast charger 32 is connected to the vehicle, to the vehicle control unit 28. When the vehicle control unit 28 determines that the connection plug 34 of the fast charger 32 is connected to the connector 31 from the signal transmitted by the communicating means 38, a drive signal is output to the coil L4c of the relay L4 from the vehicle control unit 28. As a result, the relay L4 serving as the first switching means switches ON, whereby the fast charging lines 21a, 21b are switched from a disconnected state to a connected state. Then, when a charging start possible signal is transmitted from the micro-controller 37 of the fast charger 32 to the vehicle control unit 28 via the communicating means 38, 62, the vehicle control unit 28 outputs a drive signal to the coil L1c of the relay L1, and as a result, charging of the high voltage battery 16 is performed by the fast charger 32.

Similarly, when the connection plug 43 of the normal charging connector 41 shown in FIG. 3 is attached to the connector 31, the detection switch S1 is switched ON by the connection plug 43 and a signal is transmitted to the communicating means 62 from the vehicle control unit 28. On the basis of a request signal issued to the communicating means 46 of the normal charging connector 41 by the communicating means 62, the communicating means 46 transmit information indicating the type thereof, or in other words that the normal charging connector 41 is connected, to the vehicle control unit 28. When the vehicle control unit 28 determines that the connection plug 43 of the normal charging connector 41 is connected to the connector 31 from the signal transmitted by the communicating means 46, a drive signal is output to the coil L5c of the relay L5 from the vehicle control unit 28. As a result, the relay L5 serving as the second switching means switches ON, whereby the normal charging lines 23a, 23b are switched from a disconnected state to a connected state and an AC 100V commercial power supply is supplied to the in-vehicle charger 22. Then, when the charging start possible signal is transmitted from the micro-controller 45 of the normal charging connector 41 to the vehicle control unit 28 via the communicating means 46, 62, the vehicle control unit 28 outputs a drive signal to the coil L2c of the relay L2, and as a result, charging of the high voltage battery 16 is performed by the in-vehicle charger 22.

On the other hand, when the power of the high voltage battery 16 is supplied to a power supply circuit including a high voltage battery in another electric automobile to charge the high voltage battery, the vehicle 10 is connected to the other vehicle by the feeding connector 51 shown in FIG. 4. When the connection plug 53 is attached to the connector 31, the detection switch S1 is switched ON by the connection plug 53 and a signal is transmitted to the communicating means 62 from the vehicle control unit 28. On the basis of a request signal issued to the communicating means 57 of the feeding connector 51 by the communicating means 62, the communicating means 57 transmit information indicating the type thereof, or in other words that the feeding connector 51 is connected, to the vehicle control unit 28. Further, when the connection plug 53 is connected to a connector of the other electric automobile, the communicating means 59 output a signal to communicating means, not shown in the drawings, of the other vehicle. When the vehicle control unit 28 determines that the connection plug 53 of the feeding connector 51 is connected to the connector 31 from the signal transmitted by the communicating means 57, a drive signal is output to the coil L6c of the relay L6 from the vehicle control unit 28. As a result, the relay L6 serving as the third switching means switches ON, whereby the feeder lines 25a, 25b are switched from a disconnected state to a connected state and the feeder unit 24 is electrically connected to a power supply device of the other vehicle. Then, when the charging start possible signal is transmitted from the micro-controller 56 of the feeding connector 51 to the vehicle control unit 28 via the communicating means 57, 62, the vehicle control unit 28 outputs a drive signal to the coil L3c of the relay L3, and as a result, the power source of the other electric automobile is charged by the high voltage battery 16.

As well as charging another electric automobile, the feeding connector 51 is used in a case where the power of the high voltage battery in the other electric automobile is charged to the high voltage battery 16 of the vehicle 10. At this time, the high voltage battery 16 is charged by transmitting a control signal from the vehicle control unit 28 to the feeder unit 24 via the communication network 30.

The fast charging circuit 21, in-vehicle charger 22, and feeder unit 24 are connected to the power supply circuit 17 via the relays L1 to L3, respectively, and when one of the connection plugs is attached to the connector 31 such that one of the relays L4 to L6 switched ON, the relays L1 to L3 are driven by a signal from the vehicle control unit 28.

The in-vehicle charger 22, which charges the high voltage battery 16 by rectifying and boosting an AC 100V commercial power supply, is installed in the electric automobile shown in FIG. 1 as a normal charger. However, normal charging may be performed on the high voltage battery 16 from the exterior of the vehicle using a normal charger having a similar structure to that of the in-vehicle charger 22. In this case, the normal charger takes a substantially identical form to the fast charger 32 shown in FIG. 2, except when the voltage of the commercial power supply supplied from the outside is different, and a boost converter is installed in the normal charging connector 41 shown in FIG. 3.

When one of the connection plugs 34, 43 and 53 is connected to the connector 31, information communication is performed wirelessly between the respective connection plugs and the vehicle side. However, by providing conductive terminals on the connector 31 and the connection plugs, information communication may be performed through a wired connection. Note, however, that when information communication is performed wirelessly, as described above, the conductive terminals employed for wired communication are not required, and therefore the structure of the connector 31 and the respective connection plugs is simplified. Information communication may also be performed through optical communication instead of wireless communication.

The present invention is not limited to the embodiment described above, and may be subjected to various modifications within a scope that does not depart from the spirit thereof. For example, in the illustrated electric automobile, the front wheels 11 serve as drive wheels, but the rear wheels 12 may also be drive wheels. Moreover, a lithium ion battery is used as the high voltage battery 16, but another type of secondary battery, for example an electrochemical capacitor such as an electric double layer capacitor, may be used instead. Furthermore, an electric automobile in which an electric motor serves as the sole drive source was illustrated in the above embodiment, but the present invention may also be applied to a hybrid-type electric automobile having an engine in addition to an electric motor.

What is claimed is:

1. A charging device for an electric automobile, which charges a storage device that supplies power to an electric motor for driving a vehicle, comprising:
   a connector having a common connection terminal to which a fast charging line, which is connected to a power supply circuit for supplying the power of the storage device to the electric motor, and a normal charging line, which is connected to the power supply circuit, are respectively connected;
   first switching means for switching the fast charging line to a connected state when a connection plug of a fast charger having a connection terminal that is connected to the common connection terminal is attached to the connector;
   second switching means for switching the normal charging line to a connected state when a normal charging connection plug having a connection terminal that is connected to the common connection terminal is attached to the connector; and
   control means which, when one of the connection plugs is attached to the connector, switch the switching means corresponding to the connection plug to a connected state in accordance with a type of the connection plug.

2. The charging device for an electric automobile according to claim 1, further comprising:
   a feeder line that is connected to a feeder circuit having a feeder unit connected to the power supply circuit, and connected to the common connection terminal; and
   third switching means that include a connection terminal connected to the common connection terminal and switch the feeder line to a connected state when a feeding connector connected to a power supply circuit of another vehicle is attached to the connector,
   wherein the control means switch the third switching means to a connected state when a connection plug of the feeding connector is attached to the connector.

3. The charging device for an electric automobile according to claim 2, wherein the feeder unit supplies the power of the storage device to the power supply circuit of the other vehicle via the feeding connector attached to the connector.

4. The charging device for an electric automobile according to claim 2, wherein power from the other vehicle is supplied to the storage device via the feeding connector attached to the connector.

5. The charging device for an electric automobile according to claim 1, wherein an in-vehicle charger is provided on the normal charging line such that when the normal charging connection plug is attached to the connector, the in-vehicle charger rectifies power supplied from an external commercial power supply via the connection plug and charges the storage device with the rectified power.

6. The charging device for an electric automobile according to claim 1, wherein each of the connection plugs is provided with plug side communicating means for outputting a signal corresponding to the type of the connection plug to vehicle side communicating means provided in the vehicle, and
   the control means determine the type of the connection plug on the basis of a signal from the vehicle side communicating means.

* * * * *